United States Patent [19]
Wright

[11] 3,915,924
[45] Oct. 28, 1975

[54] OPTICALLY CLEAR VOID FILLING COMPOUND

[75] Inventor: John H. Wright, Elnora, N.Y.

[73] Assignee: General Electric Company, Waterford, N.Y.

[22] Filed: Dec. 18, 1974

[21] Appl. No.: 533,977

[52] U.S. Cl. ............................................. 260/37 SB
[51] Int. Cl.$^2$ ........................................ C08L 83/04
[58] Field of Search ................................ 260/37 SB

[56] References Cited
UNITED STATES PATENTS

| | | | |
|---|---|---|---|
| 2,718,483 | 9/1955 | Clark | 260/37 SB X |
| 2,743,192 | 4/1956 | White | 260/37 SB X |
| 3,624,023 | 11/1971 | Hartlage | 260/37 SB |

*Primary Examiner*—Lewis T. Jacobs
*Attorney, Agent, or Firm*—Donald J. Voss, Esq.; E. Philip Koltos, Esq.; Frank L. Neuhauser, Esq.

[57] ABSTRACT

There is provided an optically clear void filling compound for filling voids where it is necessary to have at least 80% of the electromagnetic waves striking the void to pass there through by having a diorganopolysiloxane polymer having a viscosity of anywhere from 100 to 100,000 centipoise at 25°C where the organo groups are methyl and phenyl and the total phenyl content varies from 29 to 34 percent and there is incorporated into the diorganopolysiloxane a filler at a concentration of 4 percent to 20 percent by weight of said diorganopolysiloxane and said filler is selected from the class consisting of untreated fumed silica and untreated precipitated silica. The use of the filler in the compound imparts to it consistency.

16 Claims, No Drawings

OPTICALLY CLEAR VOID FILLING COMPOUND

BACKGROUND OF THE INVENTION

The present invention relates to an optically clear void filling compound and, more specifically, relates to optically clear void filling compounds for equipment in which it is necessary that at least 80% of the electromagnetic waves striking such compound will be allowed to pass there through and will not be refracted or reflected.

Various equipment require passage or electromagnetic waves there through and, more specifically, require visible light to be transmitted through transparent surfaces whether of glass or of clear plastic and then pass on into receiving means which make certain determinations or observations. It is desired that the electromagnetic waves being passed through a clear plastic or the clear glass that all such waves, or most of them, be viewed and reach the light receiving means.

For instance, various cancer detecting equipment pass electromagnetic waves through certain parts of the body and then the light is transmitted through various clear surfaces such as clear plastic objects and clear glass objects into the electric light receiving object. In past times, such light was allowed to pass through these various parts of the clear glass surfaces wherein the voids between them were filled with air. However, it was found that air refracted or reflected too much of the light that came into the void surface and did not allow as much as possible of the electromagnetic waves to reach the electric receiving means. This was especially true when the air tended to have particles in it or impurities.

One means of solving this problem was to put those portions of the apparatus under vacuum, that is, to remove the air between the clear plastic and clear glass surfaces. Such maintaining of a vacuum and providng equipment with a vacuum in those void spaces tended to unduly increase the expense of the equipment and make them very bulky.

It was suggested that one means of solving this problem was to fill the voids between the clear plastic and the clear glass surfaces which may be in the apparatus with an optically clear void filling compound that would allow as much of the electromagnetic waves striking the plastic or clear glass surfaces to pass there through. The use of such an optically clear compound avoided the use of providing a vacuum between the clear plastic or clear glass surfaces. One such optically clear compound was a grease having as its basic ingredient a clear resin composed of monofunctional units and tetrafunctional units. However, such a grease or void filling compound was difficult to make and extremely expensive. Accordingly, it is entirely desirable to have an optically clear void filling compound for placing it between clear plastic parts and optically clear glass parts to fill the void between the parts and allow at least 80 percent of the electromagnetic waves striking such void filling compound to pass therethrough. It is also highly desirable that this material be as inexpensive as possible to manufacture.

Accordingly, it is one object of the present invention to provide an optically clear void filling compound which would allow at least 80 percent of the electromagnetic waves striking to pass therethrough.

It is another object of the present invention to provide a simple and economical process for producing an optically clear void filling compound which will allow at least 80 percent of the electromagnetic waves striking it to pass therethrough.

It is an additional object of the present invention to have an optically clear void filling compound which is stable upon being inserted into voids or spaces and will not run or decompose over the passage of time.

These and other objects of the present invention are accomplished by means of the compound disclosed herein below.

SUMMARY OF THE INVENTION

There is provided in accordance with the present invention an optically clear void filling compound that allows at least 80 percent of the electromagnetic waves striking it to pass therethrough comprising a diorganopolysiloxane polymer and blends of diorganopolysiloxane polymers having a viscosity of 100 to 100,000 centipoise at 25°C, where the organo groups are methyl and phenyl and the total phenyl content varies from 29 percent to 34 percent by weight into which polymers there is mixed from 4 percent to 20 percent by weight of such diorganopolysiloxane polymers and blends of polymers of a filler selected from the class consisting of untreated fumed silica and untreated precipitated silica. It is important to realize that the silica filler must be as pure as possible and free from impurities whether it is precipitated silica or fumed silica, such that the filler will give the void filling compound consistency and allow at least 80 percent of the electromagnetic waves striking the compound to pass therethrough. Preferably, the filler is a fumed silica filler which is exceptionally clean, as manufactured, and has a surface area of 100 to 500 square meters per gram and a silanol content of 0.25 percent to 1 percent by weight. For optimum performance, it is desirable that the diorganopolysiloxane polymer and blends of polymer have a viscosity of from 300 to 10,000 centipoise at 25°C and the phenyl content of the polymer vary from 29.5 to 32 percent by weight.

In order for the void filling compound of the present invention to maintain its consistency during the passage of time in its use in various electronic equipment, it is desirable there be mixed into it a polyether having oxyalkylene groups composed of both ethylene oxide and propylene oxide groups and mixtures thereof and wherein said stabilizer has a refractive index that various from 1.459 to 1.467. Preferably, such stabilizer is utilized in this composition at a concentration of 0.05 percent to 1 percent by weight of stabilizer based on the diorganopolysiloxane polymer and blends of diorganopolysiloxane polymers.

DESCRIPTION OF THE PREFERRED EMBODIMENT

Preferably, the diorganopolysiloxane polymer, that is, the basic ingredient of our void filling composition and blends of polymers having the required methyl and phenyl content, have the formula, $$R_a SiO_{4-a/2}, \qquad (1)$$

where in the above formula R is selected from the class of methyl and phenyl and a varies from 1.9 to 2.1. Such diorganopolysiloxane polymers must be composed of difunctional organosiloxy units with up to 10 mole percent of monofunctional units and monoorganotrifunctional units. It is necessary that such a polymer have a viscosity of anywhere from 100 to 100,000 centipoise viscosity at 25°C and, more preferably, has a viscosity of anywhere from 300 to 10,000 centipoise at 25°C. The more preferable range of viscosity gives a more optically clear composition which allows the maximum amount of electromagnetic waves striking it to pass therethrough.

The organo substituent groups in such diorganopolysiloxane in Formula (1) above are methyl and phenyl groups, that is, R in the above Formula (1) can only be a methyl or a phenyl group in order for the final composition to have a maximum electromagnetic waves transmission properties. The total phenyl content of the diorganopolysiloxane polymer or blends of various diorganopolysiloxane polymers must be within the range of 29 percent to 34 percent by weight. The other substituent groups are methyl.

For maximum electromagnetic wave transmission properties, it is preferable that the diorganopolysiloxane polymer have a viscosity that varies from 300 to 10,000 centipoise at 25°C. It is preferable that the total phenyl content vary within the range of 29.5 percent to 32 percent by weight. It must be understood that it is not necessary that such diorganopolysiloxane polymer be a singular polymer composition but may be a mixture of various manufactured diorganopolysiloxane polymers. It is only necessary that in the final composition and in the blends of polymers whether a single polymer composition or blends of polymer compositions, that the viscosities be within the range indicated above and that the organo substituent groups be composed solely of methyl and phenyl with a total phenyl content within the ranges specified above.

If there is utilized a blend of polymers, such different polymers in the blend must have substituent groups of only methyl and phenyl groups and the phenyl content in each individual polymer composition may be as low as 5 percent by weight and the phenyl content as high as 50 percent by weight of that particular polymer composition. Within these broad ranges for the phenyl content of the individual polymers, the final polymer composition when there is utilized a blend of polymers, must have a viscosity between 100 to 100,000 centipoise at 25°C and, preferably, a viscosity of 300 to 10,000 centipoise at 25°C. Furthermore, the phenyl content of the final polymer blend must be between 29 percent to 34 percent by weight and, more preferably, 29.5 percent to 32 percent by weight. Such diorganopolysiloxane polymers are obtained in a manner well known in the art.

One method, of course, is to take dimethyldichlorosilane and also diphenyldichlorosilane and to hydrolyze these ingredients separately in water. To the resulting individual hydrolyzates there is preferably added small concentrations of catalysts such as alkali metal hydroxide catalysts, such as potassium hydride at concentrations of 100 to 500 parts per million. Then the resulting mixture is heated at temperatures varying from 50° to 150°C. As a result of this heating and activation by the catalyst at elevated temperatures, there can be distilled off from such hydrolyzates essentially pure trisiloxanes, tetracyclicsiloxanes and pentacyclicsiloxanes having methyl and phenyl substituent groups. By heating at elevated temperatures and distilling over preferentially the tetracyclicsiloxanes, there can be obtained essentially pure octamethyltetracyclicsiloxanes and octaphenyltetracyclicsiloxanes from the individual mixtures. The resulting tetracyclicsiloxanes may then be mixed in the concentration range necessary to achieve the phenyl content and methyl content of the diorganopolysiloxane polymers of the present invention. In such mixtures there is also utilized chainstoppers to obtain the desired viscosity of the diorganopolysiloxane polymer within ranges indicated above such as 100 to 100,000 centipoise at 25°C. Such chain stoppers may be disiloxanes, trisiloxanes and tetrasiloxanes such as, for instance, hexamethyldisiloxanes. The resulting ingredients, that is, tetracyclicsiloxanes and the chain stoppers, may then be equilibrated in the presence of a small amount of equilibration catalyst at elevated temperatures of anywhere from 100 to 180°C so that after a period of 2 to 8 hours there is obtained the desired diorganopolysiloxane product of the present invention.

The catalyst that may be utilized may be various catalysts, specifically, mild acid catalysts succh as toluene sulfonic acid and acid-activated clay catalyst such as sulfuric acid activated montromillionite clay sold under the name Filtrol by the Filtrol Corporation of Los Angeles, California. Such a catalyst is utilized in a concentration of anywhere from 100 parts per million to 1 percent by weight in the equilibration system. After the equilibration has been reached and the catalyst neutralized by well known means, the cyclicsiloxanes that still remain in the composition are distilled off to leave behind the desired product.

It should be understood that this method of preparation of the diorganopolysiloxane fluid of the present invention is not the only such means and that there are various other ways of preparing such a diorganopolysiloxane polymer of Formula (1) above for utilization in the present invention.

Into such polydiorganosiloxane polymers and specifically those of formula (1) above, there is mixed in order to give the void filling compound consistency from 4 percent to 20 percent by weight of the diorganopolysiloxane polymer of silica fillers and preferably fumed silica filler and precipitated silica filler. These fillers must be untreated since they will retard the passage of electromagnetic waves in the void filling compound if they are treated in one way or another as is common in the use of such fillers. Since the precipitated silica filler tends to have impurities in it, it is preferred that there be utilized in the present invention an untreated fumed silica which can be obtained readily in the pure state. It is preferred that such a silica filler have a surface area of 100 to 500 square meters per gram and a silanol content of from 0.25 percent to 1 percent by weight. More preferably, the silanol content is from 0.25 percent to .5 percent by weight.

It must be appreciated, as was said previously, that treated silica fillers cannot be utilized in the present invention to get the desired diorganopolysiloxane polymer consistency. Other fillers, such as common inert fillers for silicone polymers, cannot be used again in our present composition.

Preferably, for a better optically clear void filling compound of the present invention, the concentration of the filler is preferred to be within 5 percent to 15 percent by weight of the diorganopolysiloxane polymer and blends of such polymer. To prepare the composition, the filler is simply mixed into the diorganopolysiloxane polymer and blends of such polymers, which filler gives the composition consistency, such as a grease consistency, so that it can be inserted into the voids of electromagnetic wave transmission equipment. This is the basic composition of the optically void filling compound of the present case.

Optionally, there may be added to such compositions a stabilizer for the purpose of maintaining a grease-like state of the composition for a prolonged period of time, such as 6 months to one year. The stabilizer may be and is preferably a polyether compound having therein ethylene oxide groups and propylene oxide groups and a refractive index that varies from 1.459 to 1.467. Generally, such stabilizer compound is utilized at a concentration of 0.05 percent to 1 percent by weight of the diorganopolysiloxane polymer and blends of such polymers and is more preferably utilized at a concentration of 0.1 percent to 0.3 percent by weight of such diorganopolysiloxane polymers in the composition.

The manufacturer and preparation of such polyether compounds is well known in the art and they are sold by various chemical manufacturing companies such as, for instance, the stabilizers or polyols sold under the trade-name Pluracol V-series Polyols which are polyethers manufactured and sold by the Wyandotte Chemicals Corporation, Wyandotte, Michigan. These Pluracol V-series Polyols have been found to be effective stabilizers in the concentration ranges noted above in the optically void filling composition of the present case. Such polyols, in addition to the fact they have ethylene oxide and propylene oxide groups in them, must have the refractive index indicated above to be suitable in the present invention. Other properties that they may have are, for instance, a specific gravity at 25°C of 1.0920; a pH in 2/½ percent aqueous solution of 6 to 8; a flash point of 510°F; a fire point of 565°F; a pour point of 20°F; percent ash of 0.3–0.4 maximum and percent water of 0.1 maximum. As mentioned previously, some materials are well known in the art and can be obtained from such companies as the Wyandotte Chemical Company, which was mentioned previously.

To get the maximum electromagnetic wave transmission properties in the void filling compound of the present invention, preferably the filler or fillers must be first mixed into the diorganopolysiloxane polymer and blends of diorganopolysiloxane polymer. After the thorough mixing of the filler into the polysiloxane polymers has been accomplished, then a stabilizer is added and mixed into the composition. It is necessary in producing the compound of the present case that the silica fillers be first mixed into the diorganopolysiloxane polymer and then, after thorough wetting by the polymer, the stabilizer be added and mixed into the composition. If this is not done, then the total final composition will not have the maximum transmission of electromagnetic waves striking it and particularly visible light waves striking it.

No other ingredients are necessary in the present composition and it must be specified that, if additional ingredients are added, it has been found that such additional ingredients may deleteriously affect the electromagnetic wave transmission properties of the optically clear void filling compounds of the present case.

The examples below are given for the purpose of illustrating the present composition and processes of the present invention and are not intended in any way or means to limit the present disclosure. All parts in the examples are by weight.

EXAMPLE 1

To 94 parts of a silicone fluid with a diphenylsiloxy content of 31 percent by weight with the rest of the substituent groups being methyl is mixed with 6 parts of a finely divided fumed silica and then passed twice through a 3-roll paint mill. The resulting compound is then placed in a vacuum chamber to remove the entrapped air. The result is an optically clear compound with light transmission values of 83 percent at 4500 A.

In a similar compound with the above ranges of ingredients there was utilized in place of the diphenylsiloxy fluid of 31 percent by weight diphenyl content a different diorganopolysiloxane fluid with a phenyl content of 40 percent by weight of diphenylsiloxy groups. It was found that with this compound and with the same concentration of ingredients as previously used, there resulted an opaque compound.

EXAMPLE 2

To 70 parts of a silicone fluid with a diphenylsiloxy content of 31 percent by weight (the rest of the silicone groups being methyl) there was mixed 6 parts of a finely divided fumed silica filler having a surface area of 320 sq. m/g and then after the two ingredients had been mixed into this composition there was added 13.2 parts of a silicone fluid containing, by weight, 49 percent diphenylsiloxy content (the rest of the groups being methyl) and 10.8 parts of a silicone fluid containing 10 percent diphenylsiloxy groups (the rest of the groups in the third polymer being methyl). The resulting mixture was then put on a 3-roll mill and deaerated to give an optically clear grease-like compound. In a different process, the same silica filler was taken and in this different process the three fluids were first mixed together and then the silica added, mixed in a 3-roll mill and deaerated. The resulting mixture was a hazy, cloudy compound. This example points out the necessity for first mixing the silica filler and the phenyl containing polymer within the phenyl containing ranges indicated in the present case. In the various fluids of the various phenyl contents indicated above, if these various phenyl fluids are blended into the basic phenyl-containing compound with the phenyl content of 29 percent to 34 percent by weight, and then the silica filler is added, then the compound that results is a hazy, cloudy compound and not the optically clear-like void filling compound that is desired and is produced by the present invention.

EXAMPLE 3

This example illustrates the stability imparted to the optically clear void filling compounds of the present invention by the polyether stabilizer of the present case. There was taken two samples of the compounds that were produced in accordance with the present invention, that is, the optically clear compounds of Examples 1 and 2, and one set of samples were allowed to stand without the use of a stabilizer in them. The other set of samples of the compounds of Examples 1 and 2 were also taken and there was added to both compounds 0.2 part of a polypropylene ethylene oxide polymer such as the Pluracol V- compounds sold by the Wyandotte Chemical Corp. The mixed compounds of Examples 1 and 2, with a stabilizer therein, were allowed to stand for a period of time. The results of the stabilized compounds and the unstabilized compounds of Examples 1 and 2 are given in Table I below:

TABLE I

| | Worked Penetration 24 Hours After Being Made | 60 Days Later |
|---|---|---|
| Example 1 Compound | 279 | 314 |
| Example 2 Compound | 293 | 331 |
| Example 1 Compound + Stabilizer | 283 | 287 |
| Example 2 Compound + Stabilizer | 297 | 300 |

The results of Table I above indicate by measured penetration of the compounds initially, that is, 24 hours after being made and penetration being measured 60 days later after being made, that the compounds of the present invention with a stabilizer in them are more resistant to degradation than the compounds of the present invention that do not have the stabilizer in them.

I claim:

1. An optically clear void filling compound that allows at least 80 percent of the electromagnetic waves striking it to pass therethrough comprising a polydiorganosiloxane polymer and blends of polydiorganosiloxane polymer having a viscosity of 100 to 100,000 centipoise at 25°C, where the organo groups are methyl and phenyl and the total phenyl content varies from 29 percent to 34 percent by weight and from 4 percent to 20 percent by weight of said organopolysiloxane polymer and blends of polymers of a filler selected from the class consisting of untreated fumed silica and untreated precipitated silica.

2. The compound of claim 1 where the filler has a surface area of 100 to 500 square meters per gram and a silanol content of from 0.25 percent to 1 percent by weight.

3. The compound of claim 1 wherein the filler is present at a concentration range of 5 percent to 15 percent by weight of the diorganopolysiloxane polymer and blends of polymers.

4. The compound of claim 1 wherein the diorganopolysiloxane polymer and blends of polymers have the formula, $$R_a SiO_{4-a/2},$$

where R is methyl and phenyl, and a varies from 1.9 to 2.1.

5. The compound of claim 4 wherein the viscosity of the polysiloxane polymer and blends of polysiloxane polymers varies from 300 to 10,000 centipoise at 25°C and there is present in the polymer or blends of polymers 29.5 percent to 32.0 percent by weight of phenyl radicals.

6. The compound of claim 1 wherein there is present, based on weight of said polysiloxane polymer and blends of polymers, 0.05 percent to 1 percent by weight of stabilizer which is a polyether having oxyalkylene groups selected from the class consisting of ethylene oxide and propylene oxide and mixtures thereof, and a refractive index that varies from 1.459 to 1.467.

7. The compound of claim 6 wherein the concentration of said stabilizer varies from 0.1 percent to 0.3 percent by weight.

8. The compound of claim 1 wherein the blend of diorganopolysiloxane polymers comprises polymers having a phenyl content as low as 5 percent by weight and polymers having a phenyl content as high as 50 percent by weight.

9. A process for making an optically clear void filling compound that allows at least 80 percent of the electromagnetic waves striking it to pass therethrough comprising mixing a filler selected from the class consisting of untreated fumed silica and untreated precipitated silica into a diorganopolysiloxane polymer and blends of polysiloxane polymers having a viscosity of 100 to 100,000 centipoise at 25°C where the organo groups are methyl and phenyl and the total phenyl content varies from 29 percent to 34 percent by weight and said filler comprises 4 percent to 20 percent by weight of said organopolysiloxane polymer and blends of polymers 10. The process of claim 9 where the filler has a surface area of 100 to 500 square meters per gram and a silanol content of from 0.25 percent to 1 percent by weight.

11. The process of claim 9 wherein the filler is present at a concentration of 5 percent to 15 percent by weight of the diorganopolysiloxane polymer and blends of polymers.

12. The process of claim 9 wherein the diorganopolysiloxane polymer and blends of polymers have the formula, $$R_a SiO_{4-a/2},$$

where R is methyl and phenyl and a varies from 1.9 to 2.1.

13. The process of claim 12 wherein the viscosity of the polymer and blends of polysiloxane polymers varies from 300 to 10,000 centipoise at 25°C and there is present in such polymers and blends of polymers 29.5 percent to 32.0 percent by weight of phenyl radicals.

14. The process of claim 9 further comprising adding to the mixture, based on the weight of said polysiloxane polymer and blends of polymers, 0.05 percent to 1 percent by weight of a stabilizer which is a polyether having oxyalkylene groups selected from the class consisting of ethylene oxide, propylene oxide and mixtures thereof and a refractive index that varies from 1.459 to 1.467.

15. The process of claim 14 wherein the concentration of said stabilizer varies from 0.1 percent to 0.3 percent by weight.

16. The process of claim 9 wherein the blend of diorganopolysiloxane polymers comprises polymers having a phenyl content as low as 5 percent by weight and polymers having a phenyl content as high as 50 percent by weight.

* * * * *

UNITED STATES PATENT AND TRADEMARK OFFICE
CERTIFICATE OF CORRECTION

PATENT NO. : 3,915,924
DATED : October 28, 1975
INVENTOR(S) : John H. Wright

It is certified that error appears in the above-identified patent and that said Letters Patent are hereby corrected as shown below:

Column 2, lines 47 and 48 - delete "various" and substitute therefore - varies -

Column 5, line 19, delete "manufacturer" and substitute therefore - manufacture -

Signed and Sealed this

*twenty-seventh* Day of *April 1976*

[SEAL]

Attest:

RUTH C. MASON
*Attesting Officer*

C. MARSHALL DANN
*Commissioner of Patents and Trademarks*